United States Patent Office 3,635,992
Patented Jan. 18, 1972

3,635,992
CERTAIN CARBAMATE DERIVATIVES OF 5-SULFON AMIDO-2-PYRIDINE METHANOLS
Michiro Inoue, Hisako Ishikawa, Takio Shimamoto, and Masayuki Ishikawa, Tokyo, Japan, assignors to Zaidan Hojin Dohmyakukohka Kenkyu Shoreikai, Tokyo, Japan
No Drawing. Filed Mar. 25, 1969, Ser. No. 810,356
Claims priority, application Japan, Apr. 8, 1968, 43/22,804
Int. Cl. C07d 31/50
U.S. Cl. 260—294.8 F    14 Claims

ABSTRACT OF THE DISCLOSURE

Carbamates of pyridinemethanol derivatives represented by the formula:

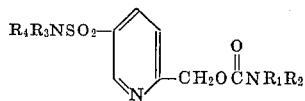

wherein $R_1$ stands for hydrogen atom or alkyl group, $R_2$ stands for hydrogen atom or alkyl, allyl, aryl, aralkyl, furfuryl, picolyl or pyridyl group, $R_3$ stands for hydrogen atom or alkyl group and $R_4$ stands for hydrogen atom, alkyl group or radical represented by the formula: —$COOR_5$ wherein $R_5$ stands for alkyl group or

—$CONR_6R_7$ wherein $R_6$ and $R_7$ stands for hydrogen atom or alkyl group, and $R_1$ and $R_2$ or $R_3$ and $R_4$ can together form a divalent alkylene group which may be interrupted by heteroatom, and process for the production thereof.

The present invention relates to new carbamates of pyridine-methanol derivatives for pharmaceutical use, and their manufacture.

According to the present invention, we provide carbamates of pyridinemethanol derivatives which are represented by the general formula:

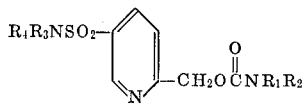   (I)

wherein $R_1$ stands for a hydrogen atom or an alkyl group, $R_2$ stands for a hydrogen atom or an alkyl, allyl, aryl, aralkyl, furfuryl, picolyl, or pyridyl group, $R_3$ stands for a hydrogen atom or an alkyl group, and $R_4$ stands for a hydrogen atom, an alkyl group, or a radical represented by the general formula: —$COOR_5$ wherein $R_5$ stands for an alkyl group or —$CONR_6R_7$ wherein $R_6$ and $R_7$ stand for each a hydrogen atom or an alkyl group, and $R_1$ and $R_2$ or $R_3$ and $R_4$ can together form a divalent alkylene group which may be interrupted by a heteroatom.

These compounds are useful in the treatment of inflammatory diseases including rheumatic disorders such as rheumtic fever and rheumatoid arthritis.

The new compounds can be manufactured by
(a) Reacting a compounds of the general formula:

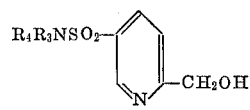   (II)

wherein $R_3$ and $R_4$ have the same meanings as in the Formula I and $R_3$ and $R_4$ can together form a divalent alkylene group which may be interrupted by a heteroatom, with a compound of the general formula:

$$R_2NCO \quad (III)$$

wherein $R_2$ stands for an alkyl, allyl, aryl, aralkyl, furfuryl, picolyl or pyridyl group, or (b) Converting a compound of the general Formula II by known processes to an aryloxyformate ester of the general formula:

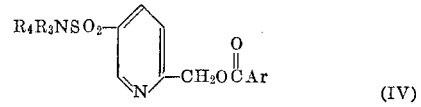   (IV)

wherein $R_3$ and $R_4$ have the same meanings as in the Formula I and $R_3$ and $R_4$ can together form a divalent alkylene group which may be interrupted by a heteroatom and Ar represents an aryl group, and thereafter reacting the aryloxyformate with ammonia or an amine of the general formula:

$$NHR_1R_2 \quad (V)$$

wherein $R_1$ and $R_2$ have the same meanings as in the Formula I and $R_1$ and $R_2$ can together form a divalent alkylene group which may be interrupted by a heteroatom.

(c) Converting a compound of the general Formula II by a known process to a chlorocarbonic ester of the general formula:

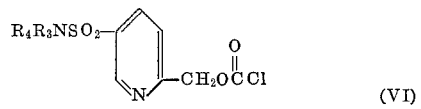   (VI)

wherein $R_3$ and $R_4$ have the same meanings as in the Formula I and $R_3$ and $R_4$ can together form a divalent alkylene group which may be interrupted by a heteroatom with phosgene, and thereafter reacting the chlorocarbonic ester with ammonia or an amine of the general Formula V.

In the process (a), the compound of (II) is reacted with an equimolar quantity of an excess, especially between 1.5 and 2 moles, of the isocyanate (III) in an inert solvent or diluent, such as benzene, toluene, chlorobenzene, acetonitrile, chloroform, tetrahydrofuran, or pyridine. The reaction is preferably carried out at a temperature between room temperature and 150° C., especially under 100° C. If necessary, a catalyst such as a tertiary amine, for example trimethylamine, triethylamine, an N-alkylpiperidine or pyridine, may be used. In place of the isocyanate (III), compounds which can be converted to such an isocyanate under the reaction conditions can be used, with if necessary a catalyst to promote such conversion. For example, acyl azides represented by the formula $R_2CON_3$ or S-alkyl thiolcarbamates represented by the formula $R_2NHCOS$-alkyl may be used with heat; S-alkyl thiolcarbamates may also be used in the presence of a trialkylamine and a heavy metal salt such as silver nitrate. This process can only be used to make compounds in which $R_1$ but not $R_2$ is a hydrogen atom.

In the process (b), the compound of the Formula II is converted to an aryloxyformate ester, for example, by reaction with an arylchloroformate represented by the general formula ArOCOCl. And then the aryloxyformate ester (IV), which may be isolated, is reacted with ammonia or the amine (V) at a temperature between 0° and 100° C., preferably at around room temperature. The reaction sequence can be represented by the following scheme.

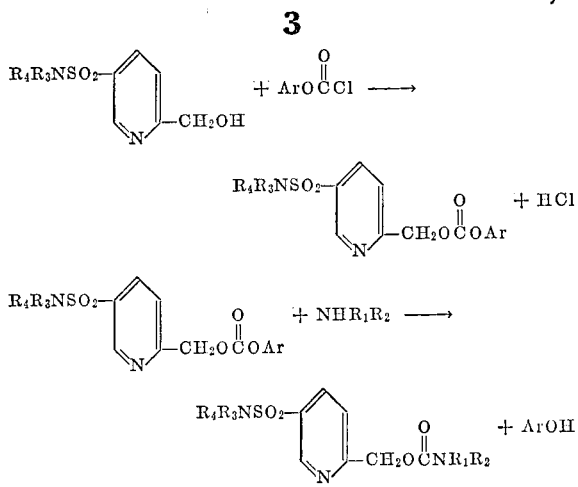

In above two scheme, $R_1$, $R_2$, $R_3$ and $R_4$ have the same meanings as in the Formula I and Ar has the same meanings as in the Formula IV. The aryl group of the arylchloroformate of the formula ArOCOCl may be substituted with a halogen atom or an alkyl, alkoxy, or nitro group. Among these phenylchloroformate is preferred because of economical reasons. p-chlorophenyl-, p-bromophenyl-, p-nitrophenyl-, and α- or β-naphthylchloroformate can also be used. The reaction with amine can be effected in the presence or absence of solvents or diluents, e.g. methanol, ethanol, or another low molecular alcohol. The presence of water does not hinder the reaction seriously. As the example of the amine represented by the Formula V, a primary amine such as methyl-, ethyl-, propyl-, isopropyl-, butyl- and amylamine, a secondary amine such as dimethyl-, di-ethylamine, pyrolidine, piperidine and morpholine, and an aralkyl amine such as benzylamine, picolylamine, and furfurylamine may be mentioned.

In the process (c), the compound of the Formula II is converted to or chlorocarbonic ester (VI) by reaction with phosgene. The reaction is effected in the presence of a solvent or diluent. A catalyst or dehydrochlorinating agent such as dimethylaniline and pyridine can be used. The reaction is effected preferably at lower temperature, particularly below 0° C. And then the chlorocarbonic ester (VI) is reacted, without isolation, with ammonia or an amine represented by the Formula V. The reaction with amine is effected also in the presence of solvents and at around room temperature.

Whatever method of manufacture is used, the products can be separated and purified by conventional methods as described hereinafter.

The invention is illustrated by the following examples in which "parts" are by weight except where otherwise stated, and "parts by weight" relate to "parts by volume" as gram to ml.

EXAMPLE 1

To a solution of 5 parts of 2-hydroxymethyl-5-sulfonyl-monomethyl-amidopyridine in 100 parts by volume of pyridine was added 2 parts of methyl isocyanate. The solution was allowed to stand at room temperature for 12 hours, and then heated for one hour at 100° C. The solvent was distilled off under reduced pressure, and the residue was recrystallized from aceton-petrol ether to obtain 5.5 parts of 2-hydroxymethyl-5-sulfonyl-mono-methylamidopyridine N-methylcarbamate melting at 128°–129° C. The product has the following formula.

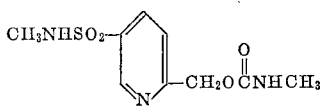

Analysis.—Calcd. for $C_9H_{13}O_4N_3S$ percent): C, 41.70; H, 5.06; N, 16.21. Found (percent): C, 41.60; H, 5.13; N, 15.65.

EXAMPLES 2–4

In a similar manner to Example 1, the following products were obtained from the following starting compounds and isocyanates in a similar yield.

EXAMPLE 2

Starting compound: 2-hydroxymethyl-5-sulfonylmono-ethylamido-pyridine
Isocyanate: methyl isocyanate
Product: 2-hydroxymethyl-5-sulfonylmonoethylamido-pyridine N-methylcarbamate
Melting point: 99°–100° C. (from benzene)

EXAMPLE 3

Starting compound: 2-hydroxymethyl-5-sulfonylamido-pyridine
Isocyanate: methyl isocyanate
Product: 2-hydroxymethyl-5-sulfonylamidopyridine N-methylcarbamate

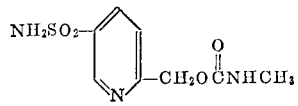

Melting point: 168°–169° C. (from acetone-petrol ether)

EXAMPLE 4

Starting compound: 2-hydroxymethyl-5-sulfonyldiethyl-amidopyridine
Isocyanate: methyl isocyanate
Product: 2-hydroxymethyl-5-sulfonyldiethylamidopyridine N-methylcarbamate

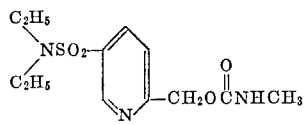

Melting point: 128°–789° C. (from ethyl acetate-petrol ether)

EXAMPLES 5–8

In a similar manner to Example 1, the following products were obtained from 2-hydroxymethyl-5-sulfonyldi-methylamidopyridine and isocyanates.

EXAMPLE 5

Isocyanate: methyl isocyanate
Product: 2-hydroxymethyl-5-sulfonyldimethylamidopyridine N-methylcarbamate

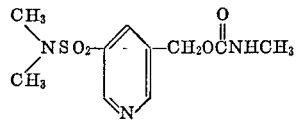

Melting point: 145°–146° C. (from acetone-petrol ether)

EXAMPLE 6

Isocyanate: isopropyl isocyanate
Product:

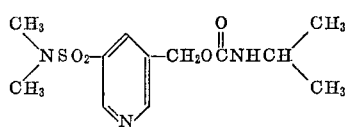

Melting point: 111°–112° C. (from ethyl acetate petrol ether)

EXAMPLE 7

Isocyanate: allyl isocyanate
Product: 2-hydroxymethyl-5-sulfonyldimethylamidopyridine N-allylcarbamate
Melting point: 108°–109° C. (from ethyl acetate-petrol ether)

EXAMPLE 8

Isocyanate: benzyl isocyanate
Product: 2 - hydroxymethyl-5-sulfonyldimethylamidopyridine N-benzylcarbamate
Melting point: 123°–124° C. (from methanol)

EXAMPLES 9–12

In a similar manner to Example 1, the following products were obtained from the following starting compounds and methyl isocyanate.

EXAMPLE 9

Starting compound:

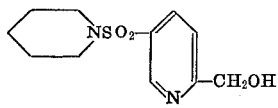

Product:

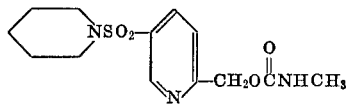

Melting point: 159°–160° C. (from ethyl acetate-petrol ether)

EXAMPLE 10

Starting compound:

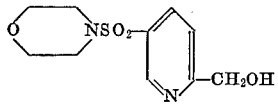

Product:

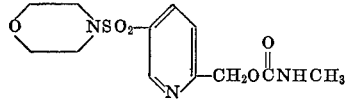

Melting point: 142°–143° C. (from methanol)

EXAMPLE 11

Starting compound:

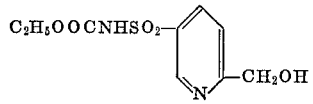

Product:

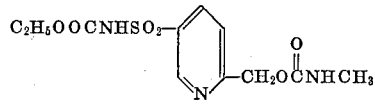

Melting point: 135°–136° C. (from ethyl acetate-petrol ether)

EXAMPLE 12

Starting compound:

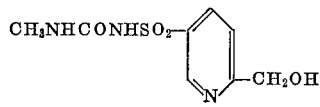

Product:

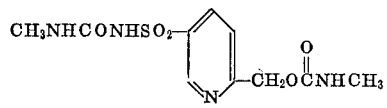

Melting point: 96°–97° C. (from acetone)

EXAMPLE 13

Three parts of 2-hydroxymethyl-5-sulfonyldimethylamidopyridine, 6 parts of S-methyl N-α-furfurylthiolcarbamate and 3 parts of triethylamine were added to a mixed solution of 20 parts by volume of pyridine and 10 parts volume of acetonitrile. To the solution was added a solution of 5.2 parts of silver nitrate in 10 parts by volume of acetonitrile with cooling and stirring. After the completion of the addition, the solution was left to stand for 12 hours and then heated at the temperature of 100° C. for 3 hours. After cooling the reaction mixture was diluted with chloroform and the precipitation was filtered off. The filtrate was washed with water, dried and was distilled under reduced pressure to remove the solvent. The obtained residue was recrystallized from ethyl acetate-petrol ether to obtain 2.5 parts of crystals melting at 88°–89° C. The product has the following formula.

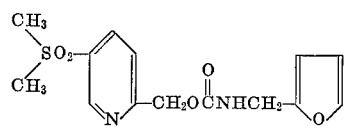

*Analysis.*—Calcd. (percent): C, 49.55; H, 5.05; N, 12.39. Found (percent): C, 51.87; H, 5.23; N, 12.13.

EXAMPLE 14

To a solution of 5 parts of 2-hydroxymethyl-5-sulfonylamidopyridine in 25 parts by volume of pyridine was added 4 parts of phenyl chloroformate with cooling and stirring. The reaction mixture was allowed to stand at room temperature over night. The reaction mixture was concentrated under reduced pressure, and then diluted with water. The resulting precipitate was filtered and recrystallized from ethanol to obtain 6.5 parts of 2-hydroxymethyl-5-sulfonylamidopyridine phenoxyformate melting at 125°–126° C., which has the following formula.

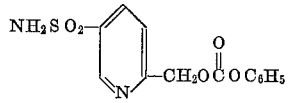

To a solution of 3.5 parts of 2-hydroxymethyl-5-sulfonylamidopyridine phenoxyformate described above in 70 parts by volume of methanol, was introduced ammonia at room temperature. After the saturation of ammonia the reaction mixture was allowed to stand for one night, and then methanol was distilled off. The residue was recrystallized from acetone-petrol ether to obtain 2.0 parts of 2-hydroxymethyl-5-sulfonylamidopyridine carbamate melting at 183°–184° C.

*Analysis.*—Calcd. for $C_7H_9O_4N_3S$ (percent): C, 36.37; H, 3.92; N, 18.18. Found (percent): C, 36.75; H, 4.13; N, 17.09.

EXAMPLE 15

To 2 parts of 2-hydroxymethyl-5-sulfonylamidopyridine phenoxy formate described in Example 14, was added a solution of monomethylamine in methanol which was prepared from 4 parts by volume of 30% aqueous monomethylamine and 100 parts by volume of methanol. The reaction mixture was allowed to stand at room temperature for one night, and then the mixture was concentrated under reduced pressure, diluted with water, and extracted with chloroform. The solvent was distilled off, and the residue was recrystallized from acetone-petrol ether to obtain 1.0 part of 2-hydroxymethyl-5-sulfonylamidopyridine N-methylcarbramate melting at 168°–169° C.

EXAMPLES 16–18

In a similar manner to Example 15, the following products were obtained from 2-hydroxymethyl-5-sulfonylamidopyridine and amines.

EXAMPLE 16

Amine: dimethylamine
Product:

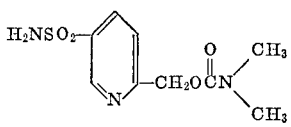

Melting point: 143°–144° C. (from ethyl acetate-petrol ether)

EXAMPLE 17

Amine: piperidine
Product:

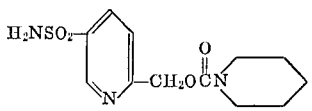

Melting point: 129°–130° C. (from acetone-petrol ether)

EXAMPLE 18

Amine: morpholine
Product:

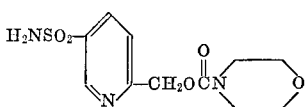

Melting point: 161°–162° C. (from acetone-ethyl acetate)

EXAMPLE 19

To a solution of 5 parts of 2-hydroxymethyl-5-sulfonyl-dimethylamidopyridine in 25 parts by volume of pyridine, was added dropwise 4 parts of phenyl chloroformate with stirring. Then the reaction mixture was stirred for 2 hours at room temperature, and was poured into water. The resulting precipitate was filtered, washed with water, and then recrystallized from methanol to obtain 7 parts of 2-hydroxymethyl - 5 - sulfonylmethylamidopyridine phenoxyformate melting at 116°–117° C.

To a solution of 4 parts by volume of 30% monomethylamine in 100 parts by volume of methanol, was added 2 parts of 2-hydroxymethyl-5 - sulfonyldimethylamidopyridine phenoxyformate described above. The reaction mixture was allowed to stand over night, and then concentrated, diluted with water, and extracted with ether. The ether extract was washed with 5% NaOH solution and water, and then distilled the solvent. The resulting residue was recrystallized from acetone-petrol ether to obtain 0.8 part of crystals melting at 145°–146° C. The product has the following formula.

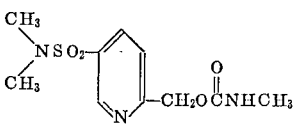

EXAMPLE 20

2-hydroxymethyl - 5 - sulfonyldimethylamidopyridine phenoxyformate described in Example 19, was treated with ammonia in a similar manner to Example 14. 2-hydroxymethyl-5-sulfonyldimethylamidopyridine carbamate recrystallized from methanol melted at 184–185° C.

EXAMPLES 21–23

In a similar manner to Example 19, the following products were obtained from 2-hydroxymethyl-5-sulfonyl-dimethylamidopyridine and amine.

EXAMPLE 21

Amine: piperidine
Product:

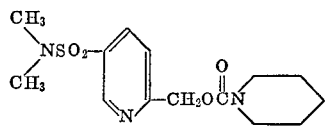

Melting point: 121°–122° C. (from methanol)

EXAMPLE 22

Amine: morpholine
Product:

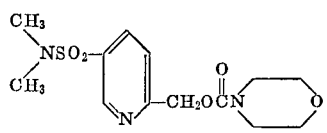

Melting point: 132°–133° C. (from methanol)

EXAMPLE 23

Amine:

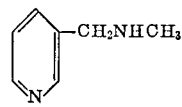

Product:

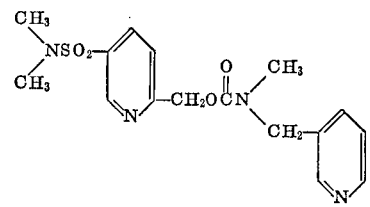

Melting point: 93°–94° C. (from ether-petrol ether)

EXAMPLES 24–26

In a similar manner to Examples 14, 15 and 19, the following products were obtained from the following starting compounds and ammonia or amines.

EXAMPLE 24

Starting compound:

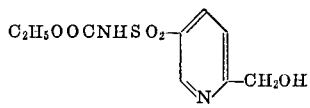

Amine: ammonia
Product:

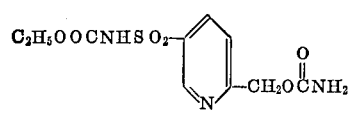

Melting point: 145°–146° C. (from methanol)

EXAMPLE 25

Starting compound:

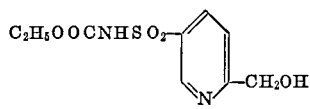

Amine: dimethylamine
Product:

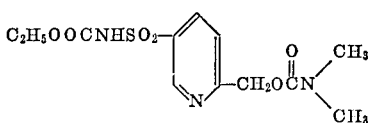

Melting point: 136°–137° C. (from ethyl acetate)

EXAMPLE 26

Starting compound:

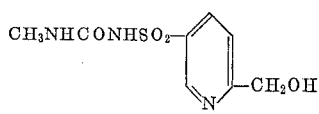

Amine: dimethylamine
Product:

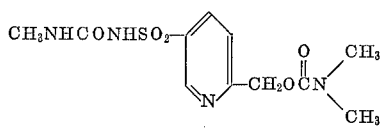

Melting point: 140°–141° C. (from acetonepetrol ether)

EXAMPLE 27

To a solution of 2.2 parts of 2-hydroxymethyl-5-sulfonyldimethylamidopyridine in 100 parts by volume of toluene, was added dropwise a solution of 1.0 part of phosgene in 10 parts by volume of toluene at 0–5° C. with stirring. After the completion of the addition, the reaction mixture was allowed to stand at room temperature for one night, and then 3.0 parts of dimethylamine was added dropwise with cooling and stirring. The reaction mixture was stirred for 5 hours at room temperature, and then washed with water. Toluene layer was separated, dried, and the solvent was distilled off. The residue was recrystallized from methanol to obtain 1.5 parts of 2-hydroxymethyl - 5-sulfonyldimethylamidopyridine N-dimethylcarbamate melting at 109°–110° C.

EXAMPLE 28 (CLINICAL EXAMPLE)

2-hydroxymethyl - 5 - sulfonylamidopyridine carbamate which was manufactured as in Example 14 was orally administered in a dose of 5 to 30 mg. per kg. a day. In adults 0.3 g., 0.5 g. or 1 g. of this substance was commonly used once or twice a day. The most common usage in adults is one gram of this substance once a day and in children it is 30 mg. per kg. once a day. A long term treatment with this substance was possible and there was found no appreciable untoward effect. The clinical action was rapid, and almost twelve hours after the administration of this substance, the edematous swelling, heat and redness of joints or petechiae in non-specific inflammatory or rheumatic disorders disappeared and the morning stiffness seen in rheumatoid arthritis showed a definite improvement. The daily administration gave a favorable effect on the course of various inflammatory conditions and purpuric conditions. Various angitis responded to this compound when this compound was administered as a long term treatment over 5 weeks.

2-hydroxymethyl - 5-sulfonylamidopyridine carbamate, 2-hydroxymethyl - 5 - sulfonylamidopyridine N-methylcarbamate, 2-hydroxymethyl - 5 - sulfonylmethylamidopyridine carbamate, 2-hydroxymethyl - 5 - sulfonylmethylamidopyridine N-methylcarbamate, 2 - hydroxymethyl-5-sulfonyldimethylamidopyridine carbamate, 2 - hydroxymethyl - 5 - sulfonyldimethylamidopyridine N-methyl carbamate, 2-hydroxymethyl - 5 - sulfonylamidopyridine N-dimethyl-carbamate, 2-hydroxymethyl - 5 - sulfonylmethylamidopyridine N-dimethyl-carbamate and 2 - hydroxymethyl - 5 - sulfonyldimethylamidopyridine N - dimethyl-carbamate have shown similar clinical effect.

What we claim is:
1. Carbamates of pyridinemethanol derivatives of the general formula:

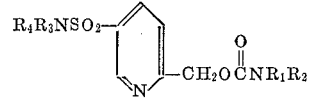

wherein $R_1$ stands for a hydrogen atom or a lower alkyl group, $R_2$ stands for a hydrogen atom, a lower alkyl or allyl group, $R_3$ stands for a hydrogen atom or a lower alkyl group, and $R_4$ stands for a hydrogen atom, a lower alkyl group, or a radical represented by the general formula: —$COOR_5$ wherein $R_5$ stands for a lower alkyl group, or —$CONR_6R_7$ wherein $R_6$ and $R_7$ stand for each a hydrogen atom or a lower alkyl group, 2. 2-hydroxymethyl - 5 - sulfonylamidopyridine carbamate.

3. 2-hydroxymethyl-5-sulfonylamidopyridine N-methyl-carbamate.

4. 2-hydroxymethyl - 5 - sulfonylmethylamidopyridine carbamate.

5. 2-hydroxymethyl - 5 - sulfonylmethylamidopyridine N-methylcarbamate.

6. 2-hydroxymethyl - 5 - sulfonyldimethylamidopyridine carbamate.

7. 2-hydroxymethyl - 5 - sulfonyldimethylamidopyridine N-methyl carbamate.

8. 2-hydroxymethyl - 5 - sulfonylamidopyridine N-dimethylcarbamate.

9. 2-hydroxymethyl - 5 - sulfonylmethylamidopyridine N-dimethyl-carbamate.

10. 2-hydroxymethyl - 5 -sulfonyldimethylamidopyridine N-dimethyl-carbamate.

11. The carbamate of the formula of claim 1 wherein $R_1$ is hydrogen, $R_2$ is allyl, $R_3$ and $R_4$ are methyl.

12. The carbamate of the formula of claim 1 wherein $R_1$ is methyl, $R_2$ is hydrogen, $R_3$ and $R_4$ are ethyl.

13. The carbamate of the formula of claim 1 wherein $R_1$, $R_2$ and $R_3$ are hydrogen, $R_4$ is ethyl.

14. The carbamates having the general formula of claim 1 wherein $R_1$ stands for a hydrogen atom or a lower alkyl group, $R_2$ stands for a hydrogen atom, a lower alkyl or allyl group, $R_3$ stands for a hydrogen atom, or a lower alkyl group, wherein $R_5$ stands for a lower alkyl group.

References Cited
UNITED STATES PATENTS

| 2,572,579 | 10/1951 | Urban | 260—295 CA |
| 3,284,461 | 11/1966 | Wilbert et al. | 260—295 CA |
| 3,501,485 | 3/1970 | Shimamoto et al. | 260—295 CA |

ALAN L. ROTMAN, Primary Examiner

U.S. Cl. X.R.

260—247.1, 999, 293.69